(No Model.) 2 Sheets—Sheet 2.
H. MUELLER.
MOTOR CYCLE.
No. 583,500. Patented June 1, 1897.
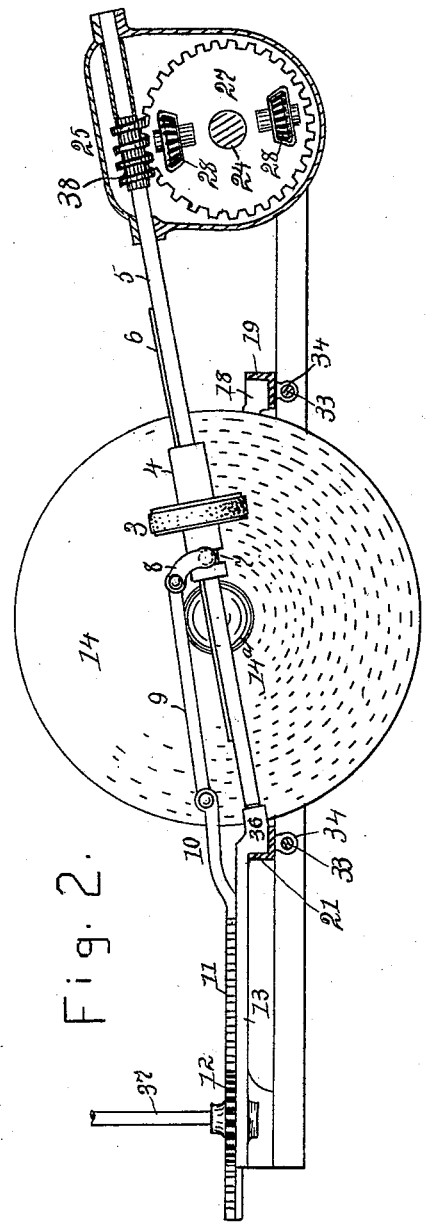
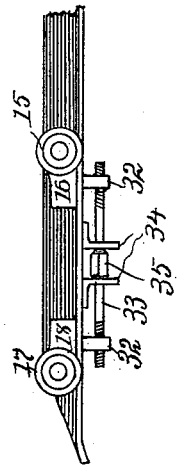
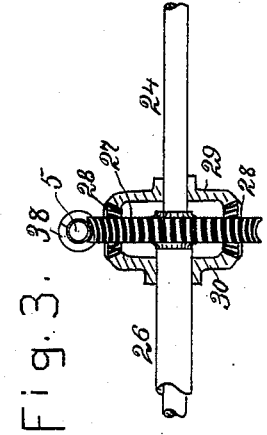
Attest
Ina Graham
Nora Graham
Inventor
H. Mueller
By L. P. Graham
atty

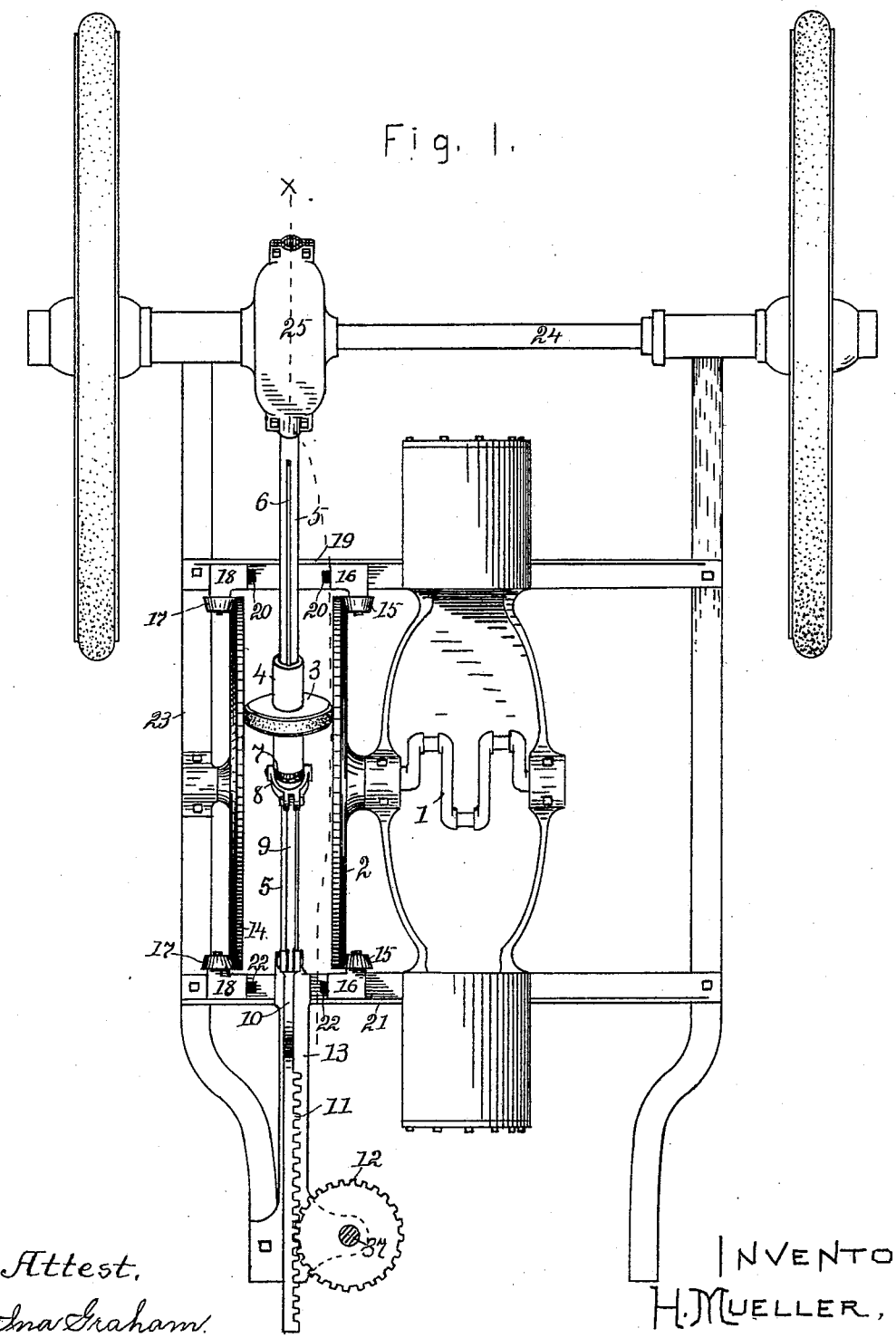

UNITED STATES PATENT OFFICE.

HIERONYMUS MUELLER, OF DECATUR, ILLINOIS.

MOTOR-CYCLE.

SPECIFICATION forming part of Letters Patent No. 583,500, dated June 1, 1897.

Application filed July 22, 1896. Serial No. 600,162. (No model.)

*To all whom it may concern:*

Be it known that I, HIERONYMUS MUELLER, of Decatur, in the county of Macon and State of Illinois, have invented certain new and useful Improvements in Motor-Cycles, of which the following is a specification.

This invention relates to power-transmitting mechanism for motor-cycles or self-propelled vehicles. It is exemplified in the structure hereinafter described, and it is defined in the appended claim.

In the drawings forming part of this specification, Figure 1 is a plan of so much of a motor-cycle as is needed to illustrate my invention. Fig. 2 is a vertical section on the irregular broken line $x$ in Fig. 1. Fig. 3 is a detail of the compensating gear. Fig. 4 is a detail of a regulating device, the peculiar characteristics of which will be hereinafter explained.

In constructing a motor-cycle embodying my invention a vertically-rotating disk 2 is fixed on an end of the crank-shaft 1 of the engine and an idler-disk 14 is journaled in the frame of the vehicle in axial alinement with disk 2 and some little distance—about six inches—therefrom. A shaft 5 extends midway between the disks, traversing the faces of the disks diametrically. Its front end is journaled in a bearing 36 in Fig. 2 on a cross-bar of the frame, and its rear end journals in the casing 25 of the compensating gear. A feather 6 is set into shaft 5, a sleeve 4, which is grooved to receive the feather, is mounted on the shaft, and a friction-pulley 3 is fixed on the sleeve in contact with the disks. The sleeve has an annular groove 7 in its front portion, and a yoke 8 engages the groove, preferably through anti-friction-rollers. A guide 13 is carried on the front end of the frame, and in it is seated a slide formed on the under side of rack 11. A pinion 12 meshes with the teeth of rack 11, and a shaft 37 rises from the pinion and provides means whereby the pinion may be rotated. A neck 10 extends upward and rearward from the rack, and a rod 9 connects the neck of the rack with yoke 8. The connections of the rod with the yoke and with the neck of the rack are both pivotal with regard to vertical motion, and the bearings are to be made sufficiently broad and close fitting to hold the yoke in its shown position. On the rear end of shaft 5 is fixed a worm 38, and such worm meshes with worm-wheel 27. The worm-wheel runs loosely on axle-shaft 24. Pinions 28 are journaled in recesses in the worm-wheel in such manner that their axes lie on a diameter of the wheel, and their toothed faces project beyond the sides of the wheel in opposite directions and to an equal extent. A gear-wheel 29 in Fig. 3 is keyed to axle-shaft 24 on one side of the worm-wheel and it meshes with pinions 28. On the opposite side of the worm-wheel a sleeve 26 is journaled on the axle-shaft, and it is provided with a gear-wheel 30, that also meshes with the teeth of pinions 28. One of the rear wheels of the vehicle is keyed onto the axle-shaft 24, the other is keyed onto sleeve 26, and the wheels, the sleeve, and the shaft are held in proper relative positions by means of a nut screwed onto that part of the axle-shaft that projects beyond the sleeve and the wheel-hub thereon.

Cross-bars 19 and 21 are on opposite sides of the disks in close proximity thereto, and they carry rollers that bear against edges of the perimeters of the disks and hold the disks against separating motion. Provision is made whereby the rollers may be adjusted to compensate for wear, and the details of such provision are as follows:

The cross-bars 19 and 21 are each provided with slots, as 20 and 22. Blocks 16 and 18, each of which carries a roller, are mounted on the cross-bars and they each have an extension 32, that projects downward through a slot. A rod 33 is right and left threaded on its opposite ends, and such ends are screwed into lugs 32. An enlargement 35 is formed on rod 33 at the center thereof, such enlargement being preferably prismatic in cross-section, and on opposite sides of the enlargement lugs 34 extend downward from the cross-bars and encircle the threaded rod.

Whenever wear of the faces of the disks, the perimeter of the pulley, the edges of the disks, or the bearing-surfaces of the rollers interfere with proper transfer of motion from disk 2 to pulley 3, the rods are turned in the right direction to draw the rollers together, and the disks are thereby pressed to any desired extent against the friction-pulley.

The disks have central depressions in their contact-faces, as indicated at 14ª in Fig. 2, and when the pulley is between the recesses it is out of contact with the disks.

The motion of the crank-shaft of the engine is imparted to the propelling-wheels of the vehicle through disk 2, pulley 3, sleeve 4, shaft 5, worm 38, and the compensating gear of which worm-wheel 27 forms a part. The speed of the vehicle is varied by shifting pulley 3 nearer to or farther from the perimeter of the disks. A stop is made by moving the pulley between the centers of the disks and a reverse or backing motion is developed by shifting the pulley to the opposite side of the centers of the disks. The shifting of the pulley is effected by the rack and pinion and the connecting-rod, but it is immaterial to the invention, broadly considered, what particular mechanism is used to effect the shifting. As shown in the drawings, the pulley receives a rotary motion that drives the vehicle forward when it is to the rear of the centers of the disks, and provision is made whereby it may be shifted from the center to the rear of the perimeter. As it is not necessary to back at a high speed, it is needless to provide for travel of the pulley to any considerable distance in front of the centers of the disks.

The worm and the compensating gear are all inclosed in casing 25, and the different bearings of the compensating gear, including the contact of the worm with the worm-wheel and the journals of the shaft, may be automatically and continuously oiled by simply putting oil inside the casing.

By running the pulley between the two disks all tendency to side motion in the drive-shaft is avoided and the required degree of pressure between the pulley and the drive-disk may be nicely adjusted and uniformly maintained by the adjustable rollers. As the rollers are to relieve the disks of strain on their central bearings, they should be placed as nearly as may be in line with the drive-shaft, although in this particular instance the rear rollers are slightly out of line.

A prominent effect of the invention is to provide direct-acting, simple, and effective driving-gear that is comparatively noiseless, that may be easily controlled, and that will permit a large degree of variation of speed with infinitely fine gradations between the extreme limits.

What I claim as new, and desire to secure by Letters Patent, is—

In driving-gear for motor-cycles, the combination of a rotatable drive-disk, an idler-disk in axial alinement with the drive-disk, a pulley between the disks and shiftable diametrically with relation thereto, a shaft for the pulley connected by suitable gearing with the drive-wheels of the vehicle, and adjustable rollers bearing against the outer edges of the perimeters of the disks.

In testimony whereof I sign my name in the presence of two subscribing witnesses.

HIERONYMUS MUELLER.

Attest:
MINNIE HOIT,
ALBERT H. BARBER.